United States Patent
Drucker et al.

(10) Patent No.: US 6,550,100 B2
(45) Date of Patent: Apr. 22, 2003

(54) CASTER ASSEMBLY WITH MULTI-POSITION SUPPORT PIECES

(75) Inventors: Marc Ian Drucker, Brighton, MA (US); John Henry Schaffeld, Lexington, MA (US)

(73) Assignee: Waxman Industries, Inc., Bedford Heights, OH (US)

( * ) Notice: Subject to any disclaimer, the term of this patent is extended or adjusted under 35 U.S.C. 154(b) by 1 day.

(21) Appl. No.: 09/779,277

(22) Filed: Feb. 8, 2001

(65) Prior Publication Data

US 2002/0144375 A1 Oct. 10, 2002

(51) Int. Cl.[7] .............................................. B60B 33/04
(52) U.S. Cl. ................. 16/31 R; 16/45; 16/19
(58) Field of Search ................. 16/31 R, 45, 19, 16/42 R, 43; 280/43.14, 43.24

(56) References Cited

U.S. PATENT DOCUMENTS

| 568,535 A | 9/1896 | Isidor |
|---|---|---|
| 835,492 A | 11/1906 | Baker |
| 2,175,317 A | 10/1939 | Rogers |
| 2,478,563 A | 8/1949 | Book |
| 3,478,381 A | * 11/1969 | Schultz, Jr. |
| 3,557,401 A | 1/1971 | Jenkins |
| 3,570,041 A | 3/1971 | Closa |
| 3,577,620 A | 5/1971 | Hoffman et al. |
| 3,639,942 A | * 2/1972 | Ostrom .......................... 16/29 |
| 3,675,269 A | 7/1972 | Closa |
| 3,744,083 A | 7/1973 | Jenkins |
| 3,818,541 A | 6/1974 | Daniels |
| 3,858,271 A | 1/1975 | Howard et al. |
| 3,861,703 A | 1/1975 | Gould |
| 3,869,105 A | 3/1975 | Daniels |
| 3,893,700 A | 7/1975 | Dunmyer |
| 3,922,754 A | 12/1975 | Andersen |

(List continued on next page.)

Primary Examiner—Lynne H. Browne
Assistant Examiner—Alison K. Pickard
(74) Attorney, Agent, or Firm—Watts, Hoffmann, Fisher & Heinke, Co., L.P.A.

(57) ABSTRACT

The present invention is directed to a caster assembly for supporting an object. The caster assembly includes a caster, a caster axle and a pair of support pieces, at least one of the support pieces being rotatably mounted on the caster axle. The support pair of support pieces each include at least two perpendicular support surfaces thereby providing for a plurality of support configurations for supporting objects having various shapes.

27 Claims, 6 Drawing Sheets

U.S. PATENT DOCUMENTS

| | | |
|---|---|---|
| 3,928,888 A | 12/1975 | Lapham |
| 3,935,613 A | 2/1976 | Kaneko |
| 3,977,040 A | 8/1976 | Sugasawara |
| 4,026,570 A | 5/1977 | Feinberg |
| 4,054,965 A | 10/1977 | Vig et al. |
| 4,068,342 A | 1/1978 | Carrier |
| 4,069,543 A | 1/1978 | James |
| 4,086,680 A | 5/1978 | Kelly |
| 4,092,031 A | 5/1978 | Greer et al. |
| 4,102,556 A | 7/1978 | Webb |
| 4,107,817 A | 8/1978 | Sloan et al. |
| 4,129,921 A | 12/1978 | Greene |
| 4,161,803 A | 7/1979 | Propst et al. |
| 4,196,493 A | 4/1980 | Propst et al. |
| 4,229,855 A * | 10/1980 | Rowe ........................... 16/29 |
| 4,262,871 A | 4/1981 | Kolk et al. |
| 4,316,305 A | 2/1982 | Seaford |
| 4,327,460 A | 5/1982 | Wolff |
| 4,332,052 A | 6/1982 | Remington |
| 4,339,842 A | 7/1982 | Fontana et al. |
| RE31,110 E | 12/1982 | Black |
| 4,402,107 A | 9/1983 | Geisler, Jr. |
| 4,409,715 A | 10/1983 | Timmer |
| 4,457,045 A | 7/1984 | Kegg |
| 4,463,840 A * | 8/1984 | Seynhaeve ................ 190/18 A |
| 4,530,543 A | 7/1985 | Keane |
| 4,550,808 A | 11/1985 | Folson |
| 4,554,704 A | 11/1985 | Raffaeli |
| 4,570,288 A | 2/1986 | Kassai |
| 4,624,028 A | 11/1986 | Wilkes |
| 4,669,580 A | 6/1987 | Neville |
| 4,679,670 A | 7/1987 | Wickman |
| 4,707,881 A | 11/1987 | Van Hoye |
| 4,719,663 A | 1/1988 | Termini |
| 4,719,664 A | 1/1988 | Berfield |
| 4,731,900 A | 3/1988 | Frobose |
| 4,731,901 A | 3/1988 | Daniels |
| 4,735,459 A | 4/1988 | Massonnet |
| 4,749,159 A | 6/1988 | Hoff |
| 4,752,986 A | 6/1988 | Rivkin et al. |
| 4,772,035 A | 9/1988 | Danial |
| 4,777,697 A | 10/1988 | Berndt |
| 4,783,880 A | 11/1988 | Chapman et al. |
| 4,788,741 A | 12/1988 | Hilborn |
| 4,793,022 A | 12/1988 | Raffaeli |
| 4,807,328 A | 2/1989 | Hezel |
| 4,839,938 A | 6/1989 | Coggin et al. |
| 4,887,824 A | 12/1989 | Zatlin |
| 4,932,729 A * | 6/1990 | Thompson et al. ......... 312/256 |
| 4,953,257 A | 9/1990 | Seynhaeve |
| 5,136,751 A | 8/1992 | Coyne et al. |
| 5,426,817 A * | 6/1995 | Rekuc ........................... 16/29 |
| 5,634,240 A | 6/1997 | Brokaw |
| 5,758,752 A * | 6/1998 | King et al. ............... 190/18 A |
| 6,408,482 B1 * | 6/2002 | Henriott et al. ................ 16/29 |

* cited by examiner

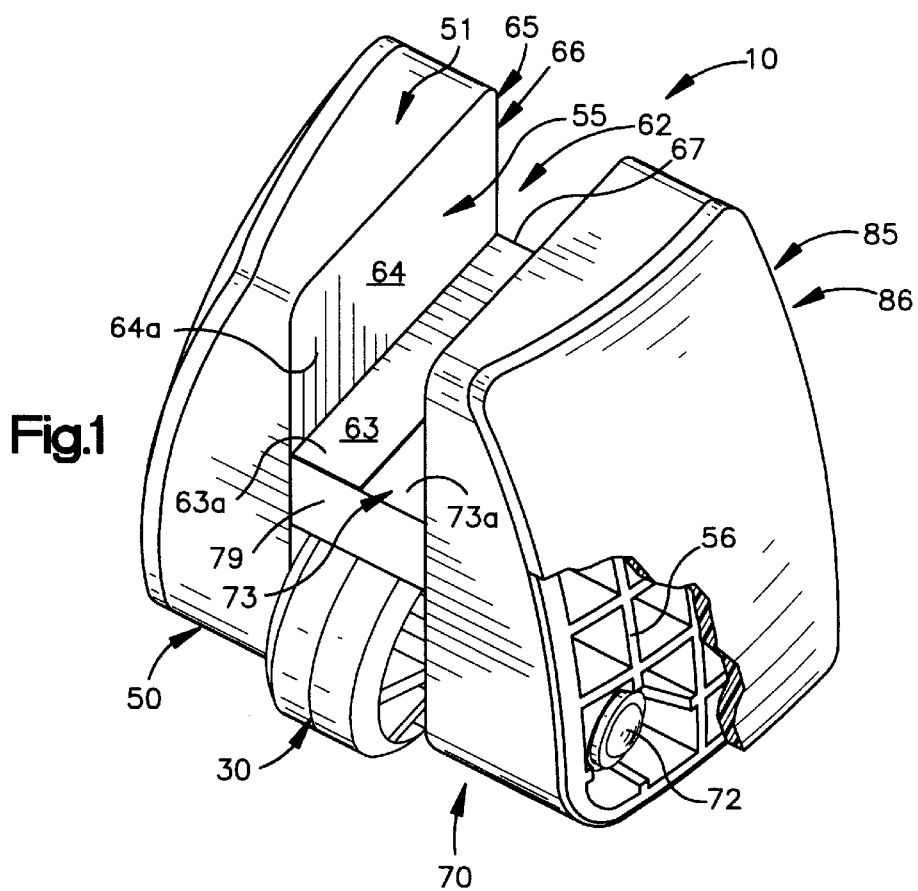
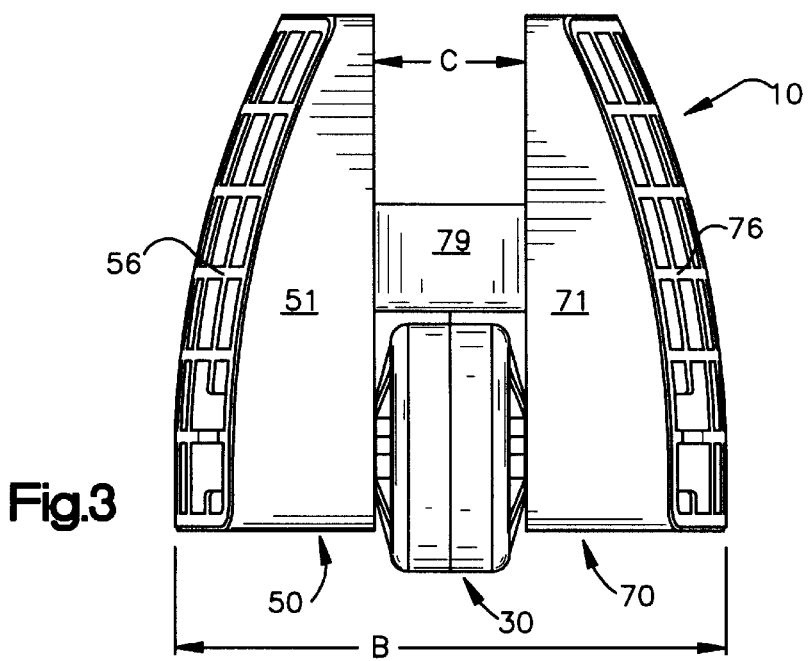

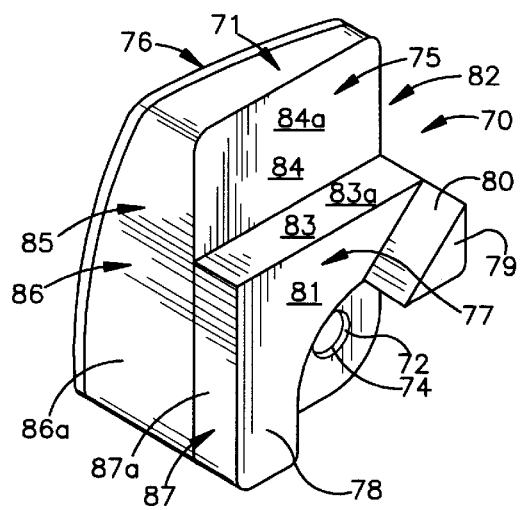
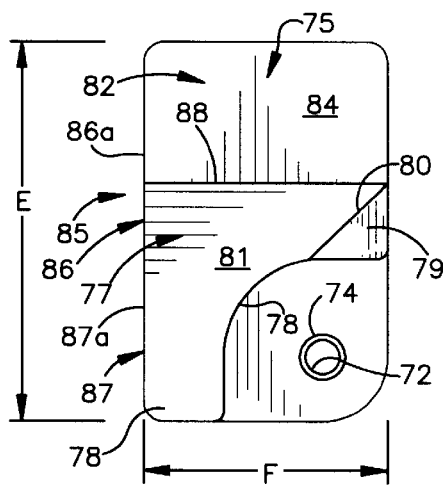
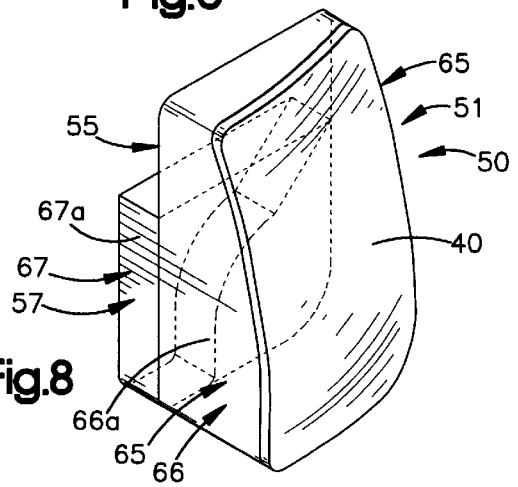
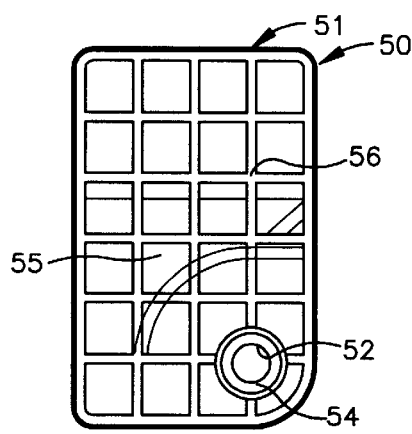
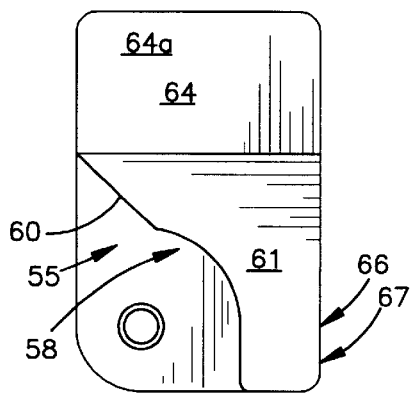

CASTER ASSEMBLY WITH MULTI-POSITION SUPPORT PIECES

FIELD OF THE INVENTION

The present invention is directed to a caster assembly for supporting an object and, more specifically, to a caster assembly including a caster, a caster axle and a pair of support pieces, at least one of the support pieces being rotatably mounted on the caster axle and including at least two perpendicular support surfaces, the support pieces being positionable to provide a plurality of support configurations for supporting the object.

BACKGROUND OF THE INVENTION

Caster assemblies are used to support an object and facilitate easy movement of an object with respect to flat surfaces such as a floor. Examples of objects using caster assemblies include household appliances such as refrigerators, vacuums, food serving trays and carts, tool carts and cabinets, various items of furniture such chairs, sofas, bed frames and the like. Typically, three or more caster assemblies are used to support an object. The caster assemblies are normally positioned or mounted on the object near an outer peripheral edge of a downward facing mounting surface of the object to provide a wide, stable base of support. A wide base of support reduces the propensity for the object to tip over during movement of the object across a floor. This is especially important for objects having a relatively high vertical center of gravity.

One drawback of prior art caster assemblies is that the mounting surface of the caster assembly mounting piece only provided for a single orientation of the mounting surface with respect to the caster axle. Therefore, such prior art caster assemblies only provide a single configuration for supporting the object.

What is needed is a caster assembly that provides for a variety of mounting configurations for supporting an object. What is also needed is a caster assembly that provides for adjustable positioning of each of support pieces along respective portions of the center axle.

SUMMARY OF THE INVENTION

The present invention is directed to a caster assembly for supporting an object. In one aspect of the present invention, the caster assembly includes a caster, a caster axle and a pair of support pieces. Each of the support pieces is mounted on the caster axle, at least one of the support pieces being rotatable with respect to the caster axle. Each of the support pieces includes at least two perpendicular support surfaces thereby providing for a plurality of support configurations for supporting the object.

In one exemplary embodiment the present invention includes a caster assembly providing a plurality of support configurations for supporting an object. The caster assembly includes: a caster axle; a caster wheel mounted on the caster axle; and first and second support pieces mounted on the caster axle, at least one of the two support pieces being rotatable with respect to the axle, the first support piece including a first support surface and a second support surface transverse to the first support surface, each of the first and second support surfaces configured to engage and support such object, the second support piece including a first support surface configured to engage and support such object.

The plurality of support configurations of the caster assembly include a first support configuration of the plurality of support configurations being defined by the first support surface of the first support piece and the first support surface of the second support piece engaging and supporting such object and a second support configuration of the plurality of support configuration being defined by the second support surface of the first support piece and the first support surface of the second support piece engaging and supporting such object.

In one preferred embodiment of the present invention, the first and second support surfaces of the first support piece are perpendicular and the second support piece includes perpendicular first and second support surfaces providing for four support configurations. In another preferred embodiment, the first and second support pieces include a throughbore for mounting the support pieces on the caster axle and at least one of the first and second support pieces are adjustably positionable along the caster axle.

The present invention also is directed to a method of supporting an object using a caster assembly that provides a plurality of support configurations. In an exemplary embodiment, the first step of the method includes: providing a caster assembly that includes a caster axle; a caster wheel mounted on the caster axle; and first and second support pieces mounted on the caster axle, at least one of the first and second support pieces being rotatable with respect to the caster axle, the first support piece including a first support surface and a second support surface transverse to the first support surface, each of the first and second support surfaces configured to engage and support the object, the second support piece including a first support surface configured to engage and support the object, a first support configuration of the plurality of support configurations being defined by the first support surface of the first support piece and the first support surface of the second support piece engaging and supporting the object and a second support configuration of the plurality of support configuration being defined by the second support surface of the first support piece and the first support surface of the second support piece engaging and supporting the object.

The steps of the method further include: rotating one of the first and second support pieces to orient the first and second support with respect to the object in a selected one of the first and second support configurations; and moving the caster assembly with respect to the object such that the first and second support pieces engage and support the object in the selected one of the first and second support configurations.

These and other objects, advantages and features of the invention will become better understood from a detailed description of an exemplary embodiment of the invention which is described in conjunction with the accompanying drawings.

BRIEF DESCRIPTION OF THE DRAWINGS

FIG. 1 is a perspective view of the caster assembly of the present invention, with a pair of support pieces oriented in a first support configuration and with one of the support piece cover plates partially cut away;

FIG. 3 is a front elevation view of the caster assembly of FIG. 1 in the first support configuration, the support pieces spaced to support a narrow rectangular object and the support piece covers removed;

FIG. 6 is a perspective view looking from the back of the second support piece of the caster assembly of FIG. 1;

FIG. 7 is a right side elevation view of the second support piece of FIG. 6;

FIG. 8 is a perspective view looking from the back of the first support piece of the caster assembly of FIG. 1;

FIG. 9 is a right side elevation view of the first support piece of FIG. 8;

FIG. 10 is a left side elevation view of the first support piece of FIG. 8;

DETAILED DESCRIPTION OF THE PREFERRED EMBODIMENT

Figure 2:
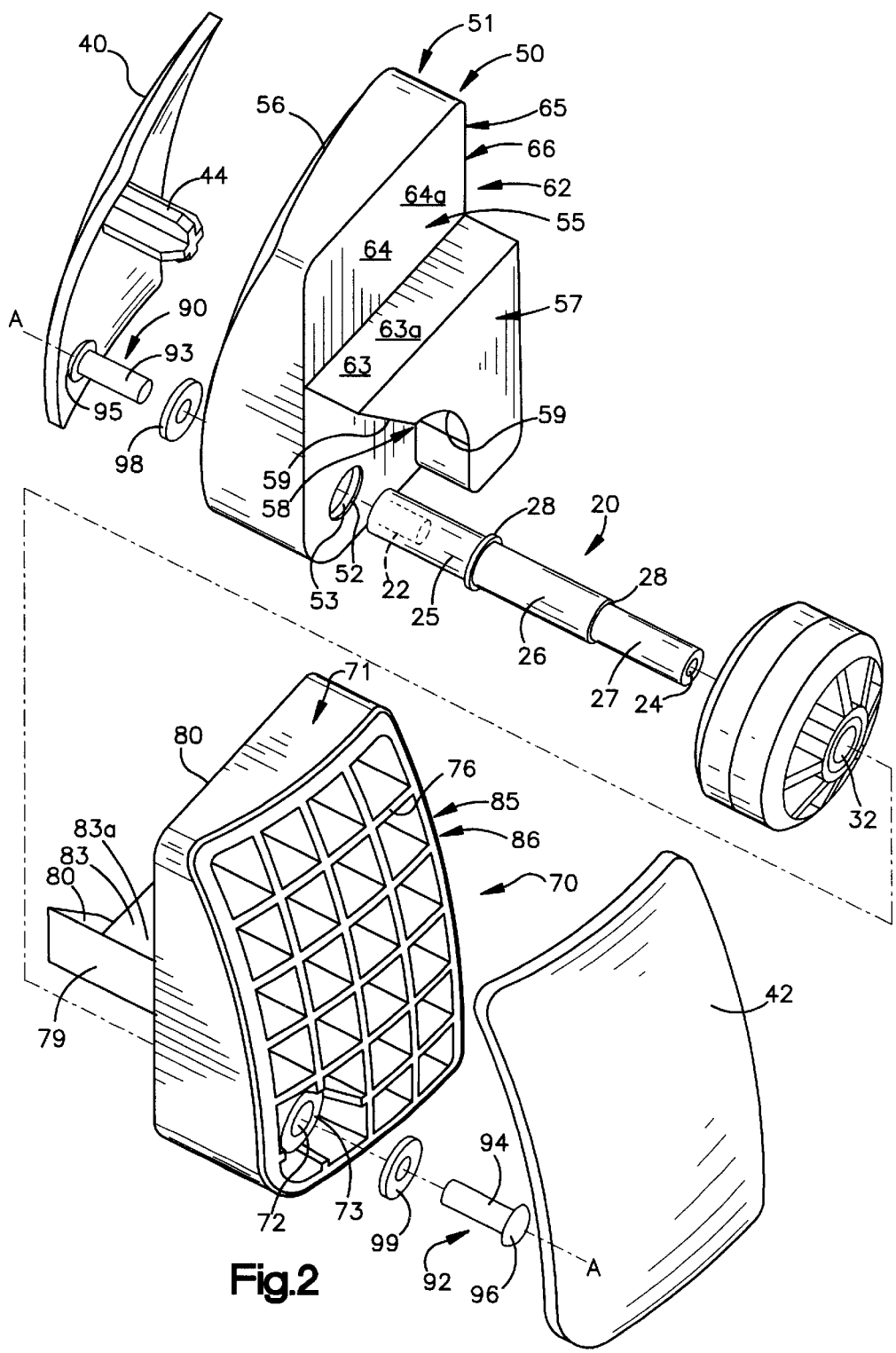
FIG. 2 is an exploded perspective of the caster assembly of FIG. 1, including the support piece cover plates.

Turning to the drawings FIGS. 1–5 show the caster assembly of the present invention generally at 10. The caster assembly 10 includes a caster axle 20 (best seen in FIG. 2) and a caster wheel 30 rotatably mounted on a center section 26 of the caster axle 20. Preferably the caster wheel is fabricated of an engineering resin material such as urethane rubber, ABS polymer plastic while the axle 20 is steel.

Also mounted on the caster axle 20 are generally rectangular-shaped first and second support pieces 50, 70. The first support piece 50 is rotatably mounted on the axle 20 while the second support piece 70 is fixedly mounted on the axle 20. In an alternate embodiment, the second support piece may be rotatably mounted on the axle 20.

As can be seen in FIG. 2, the axle 20 defines a longitudinal axis labeled as A—A in FIG. 2 and three longitudinal sections 25, 26, 27 having differing diameters. The axle section 25 has the largest diameter of the three sections 25, 26, 27 and the axle section 27 has the smallest diameter of the three sections. An axially extending boss 28 separates the largest diameter axle section 25 from the middle section 26 and a stepped portion 28 separates the middle axle section 25 from the smallest diameter axle section 27.

The first support piece 50 is rotatably mounted on the largest diameter axle section 25 and the second support piece 70 is mounted on the smallest diameter axle section 27. The support pieces 50, 70 are maintained on their respective axle sections 25, 27 by a pair of fasteners 90, 92, preferably #6×0.450 inch long steel pan head screws and corresponding steel washers 98, 99. The screws 90, 92 include threaded body portions 93, 94 which thread into threaded longitudinal openings 22, 24 in opposite ends of the axle 20. The longitudinal openings 22, 24 are centered about a longitudinal axis A—A of the axle 20.

Figure 11:
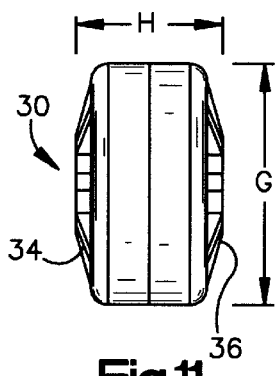
FIG. 11 is a front elevation view of the caster wheel of the caster assembly of FIG. 1.

A throughbore 32 extending through the caster wheel 30 is slightly larger than the outer diameter of the caster axle 20 thereby allowing the wheel 30 to rotate with respect to the axle section 26. Alternatively, the throughbore 32 of the caster wheel 30 may be fabricated slightly smaller in diameter than the outer diameter of the axle section 26 and the wheel 30 may be press fit on the axle 20, such an interference fit would cause the caster wheel 30 and the axle 20 to rotate in unison with respect to the first and second support pieces 50, 70, that is, the caster wheel 30 does not rotate independently of the axle 20. In such an embodiment, both the first and second support pieces 50, 70 would have to be rotatably mounted on their respective axle sections 25, 27. As can best be seen in FIG. 11, the caster wheel 30 includes longitudinally extending hubs 34, 36 which act as outer bearing surfaces to prevent the wheel from being "pinched" by the first and second support pieces 50, 70 and being unable to rotate.

The first and second support pieces 50, 70 comprise main rectangular-shaped body portions 51, 71 that define respective throughbores 52, 72 extending horizontally through the body portions 51, 71. The throughbore 52 is slightly larger in diameter than the outer diameter of the caster axle section 25 to permit the support piece 50 to be rotatably mounted on the axle section 25. The throughbore 72 is sized to have a tight interference fit with an outer surface of the axle section 27 and, therefore, the second support piece 70 is prevented from rotating with respect to the axle 20. In an alternate embodiment, if it is desired that the second support piece 70 be rotatably mounted on the axle section 27, the diameter of the throughbore 72 will be slightly larger than the outer diameter of the axle section 27.

Advantageously, at least one of the first and second support pieces 50, 70 is sized to allow limited longitudinal movement of the at least one support piece along the axle 20. In one preferred embodiment, illustrated in FIG. 12, the first support piece 50 and the axle section 25 are sized to allow limited longitudinal movement of the first support piece 50 along the axle section 25 while the second support piece 70 and the axle section 27 are sized to not allow longitudinal movement of the second support piece 70 along the axle section 27. A width of the body portion 51 of the first support piece 50 extending between a countersunk bearing surface 53 (seen in FIG. 2) and a countersunk bearing surface 54 (seen in FIG. 9) is less than a longitudinal distance between the axle boss 28 and the washer 98 which abuts a head 95 of the screw 90 when the screw 90 is threaded into the threaded opening 22 thereby permitting about 0.19 inch of longitudinal travel by the first support piece 50 along the axle section 25. In one preferred embodiment, a width of the body portion 71 of the second support piece 70 extending between a countersunk bearing surface 73 (seen in FIG. 2) and countersunk bearing surface 74 (seen in FIG. 6) is approximately equals than a longitudinal distance between a stepped portion 28 (FIG. 2) of the axle separating axle section 26 from axle section 27 and the washer 99 which abuts a head 96 of the screw 92 when the screw 92 is threaded into the threaded opening 24 thereby preventing longitudinal movement by the second support piece 70 along the axle section 27. In an alternate preferred embodiment, the second support piece 70 and the axle section 27 many be sized to permit limited longitudinal movement of the second support piece 70 along the axle section 27 in a manner similar to the first support piece 50 and the axle section 25.

The first and second support pieces 50, 70 are preferably fabricated of ABS polymer plastic or a similar durable, resilient engineered resin material. As can be seen in FIGS.

4 and 9, the main rectangular-shaped body portions 51, 71 of the first and second support pieces 50, 70 are not solid pieces but instead are comprised of a matrix of hollow longitudinally extending square channels to minimize material usage.

For each of the two support pieces 50, 70, the hollow channels of the main body portions 51, 71 extend from respective outer surfaces 56, 76 and terminate at a solid inner wall 55, 75. As can best be seen in FIGS. 2 and 6, the inner walls 53, 73 are generally rectangular in shape.

Extending inwardly (that is, toward the second support piece 70) from the inner wall 55 of the first support piece 50 is a generally triangular-shaped projection 57. As can best be seen in FIG. 2, an angled portion 58 of the projection 57 includes an arcuate portion 59 that provides clearance for the caster wheel 30. The angled portion 58 of the projection 57 also includes a planar beveled section or surface 60.

As can best be seen in FIGS. 6 and 7, extending from the inner wall 75 of the second support piece 70 inwardly, (that is, in the direction of the first support piece 50), is a generally L-shaped projection 77. A lower portion 78 of the projection 77 is arcuately shaped to provide clearance for the caster wheel 30. Further extending inwardly adjacent an upper end the L-shaped projection 77 is a triangular-shaped projection 79. The triangular-shaped projection 79 defines an extending planar beveled section or surface 80. The planar beveled section 60 of the first support piece 50 coacts with an extending beveled section 80 of the second support piece 70 to inhibit relative clockwise rotation of the first support piece 50 with respect to the second support piece 70. This rotation inhibiting feature provided by beveled sections 60, 80 prevents improper orientation of the caster assembly when a user desires to use the caster assembly in the fourth support configuration explained below.

A pair of support piece covers 40, 42 are provided to cover the first and second support piece outer surfaces 56, 76. The support piece covers 40, 42 include respective cross shaped projections or bosses (only one of which can be seen in FIG. 2 and is labeled as 46). The boss 46 is pressed into an aligned square channel of the support piece 50 to flushly secure the cover 40 to the first support piece 50. An identical securement structure secures the cover 42 to the second support piece 70.

A set of dimensions for one exemplary embodiment of the caster assembly 10 of the present invention, as labeled in FIGS. 3, 5, 8 and 11, are as follows:

| Label | Dimension |
|---|---|
| A | 2.87 inches |
| B | 2.74 inches |
| C | 1.87 inches |
| D | 0.75 inch (minimum) to 0.94 inch (maximum) |
| E | 2.665 inches |
| F | 1.665 inches |
| G | 1.250 inches |
| H | 0.725 inch |

First Support Configuration

Figure 4:
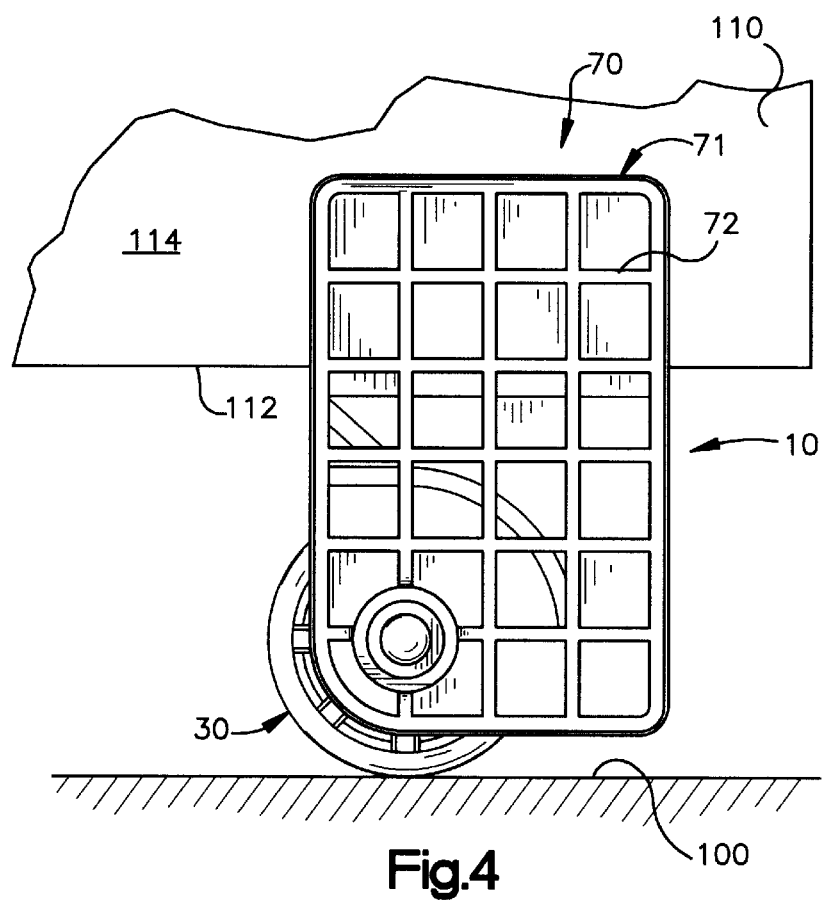
FIG. 4 is a side elevation view of the caster assembly of FIG. 1 disposed on a flat surface and supporting an object.
Figure 5:
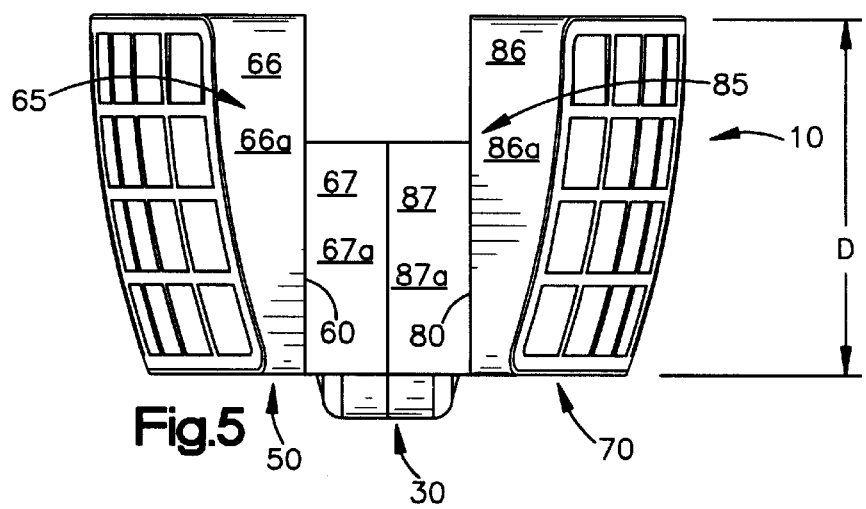
FIG. 5 is a rear elevation view of the caster assembly of FIG. 1 with the support piece cover plates removed.

A first support configuration of the caster assembly 10 is shown in FIGS. 1, 3, and 4. As can best be seen in FIG. 4, the caster assembly wheel is movable across a flat support surface 100 such as a floor. The caster assembly supports an object 110 that is narrow and rectangular in cross section. In this configuration, the first and second support pieces 50, 70 are as close together as possible, that is, an inner surface 61 of the projection 57 is abutting the inner surface 81 of the projection 77 and the beveled surfaces 60 and 80 are abutting as well. In this first configuration the inner walls 55, 75 of the first and second support pieces 50, 70 are spaced approximately 0.75 inch apart.

In the first support configuration, the object 110 is supported by a first support surface 62 of the first support piece 50 and a first support surface 82 of the second support piece 70. The first support surface 62 comprises perpendicular horizontal and vertical support surfaces 63, 64 (best seen in FIGS. 1 and 2). The horizontal support surface 63 is defined by an upper surface of the triangular shaped projection 57 and the vertical support surface 64 is defined by an upper portion of the inner wall 55. The horizontal support surface 63 of the first support surface 62 supports a portion of a bottom surface 112 (FIG. 4) of the object 110 and the vertical support surface 64 of the first support surface 62 supports a portion of a side surface 114 of the object 110.

Providing support both the bottom and side surfaces 112, 114 of the object is an advantageous feature of the first support configuration because the side surface support of the object increases the stability of the support. The stability of the support of the object 110 is further increased by the use of thin layers of adhesive 63a, 64a which is applied to the horizontal and vertical support surfaces 63, 64 and which cause the surfaces to adhesively adhere to the bottom and side surfaces 112, 114 of the object 110. The adhesive layers 63a, 64a may be in the form of double sided adhesive tape cut to shape and applied prior to use by a user of the caster assembly 10. Alternately, the adhesive layers may be a thin layer of adhesive preapplied to the support surfaces 63, 64 and covered with a peel off covering (not shown). The covering over the adhesive layer would be peeled off by a user prior to use of the caster assembly 10.

With respect to the second support piece 70, in the first support configuration, the object 110 is supported by the first support surface 82 (FIGS. 6 and 7) of the second support piece 70. The first support surface 82 comprises perpendicular horizontal and vertical support surfaces 83, 84. The horizontal support surface 83 is defined by an upper surface of the L-shaped projection 77 and the second vertical support surface 84 is defined by an upper portion of the inner wall 75. The horizontal support surface 83 of the first support surface 82 supports a portion of a bottom surface 112 (FIG. 4) of the object 110 and the vertical support surface 84 of the first support surface 82 supports a portion of a side surface 114 of the object 110.

Similarly to the first support surface 62 of the first support piece 50, a thin layer of adhesive 83a, 84a is applied to the horizontal and vertical support surfaces 83, 84 of the first support surface 82 of the second support piece 70. The layer of adhesive causes the horizontal and vertical support surfaces 83, 84 to adhesively adhere to the bottom and side surfaces 112, 114 of the object 110 thereby increasing the stability of the support.

Second Support Configuration

Figure 12:
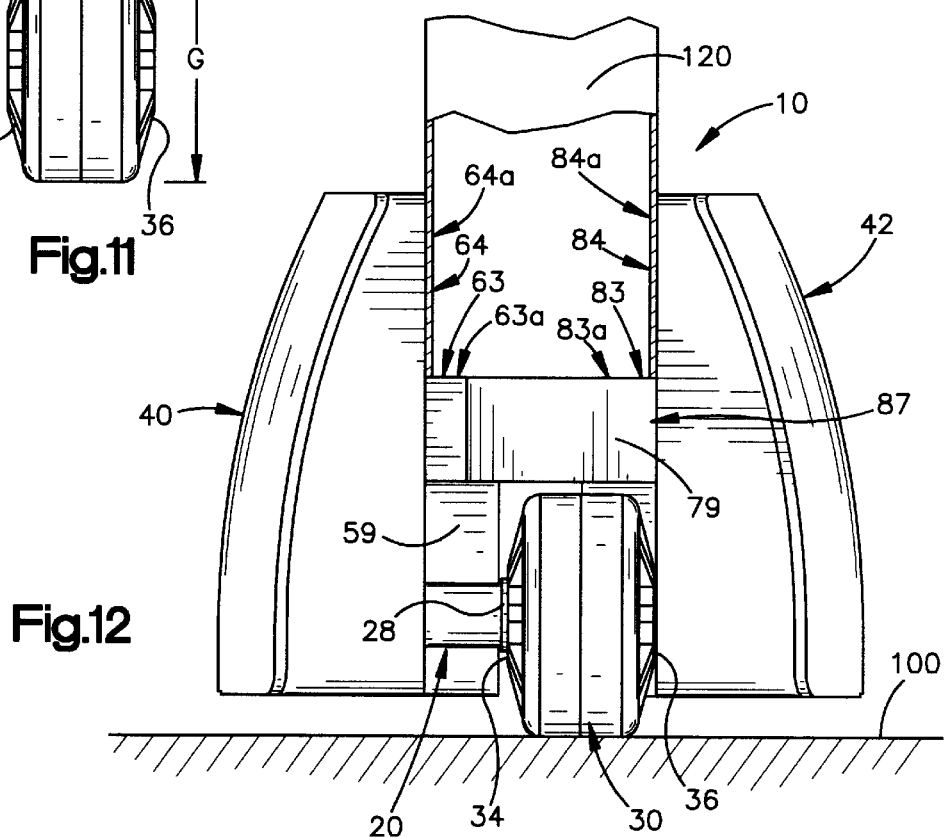
FIG. 12 is a front elevation view of the caster assembly of FIG. 1 with the support pieces spaced apart in a second support configuration to support a wider rectangular object.

As discussed above, advantageously, the first support piece 50 are movable horizontally on their respective axle portions 25, 27. This horizontal permits the first support piece 50 to be moved outwardly away from the second support piece 70 to provide a greater width between the vertical support surfaces 64, 84. FIG. 12 illustrates a second support configuration adapted to support rectangular shaped objects that have a greater width than the ¾ inch width accommodated by the support configuration shown FIG. 1. In FIG. 12, a rectangular shaped object 120 with a width of approximately 0.94 inch is being supported. The total increase in width between the vertical support surfaces 60, 80 as shown in FIG. 12 versus the width between the vertical support surfaces as shown in FIG. 1 is approximately 0.19 inch in one exemplary embodiment of the present invention. Note that even at the maximum spacing of the vertical support surfaces 64, 84, portions of the beveled surfaces 60, 80 of the respective projections 57, 87 still abut thereby preventing the second support piece 70 from being turned in a clockwise direction with respect to the first support piece 50.

Third Support Configuration

Figure 13:
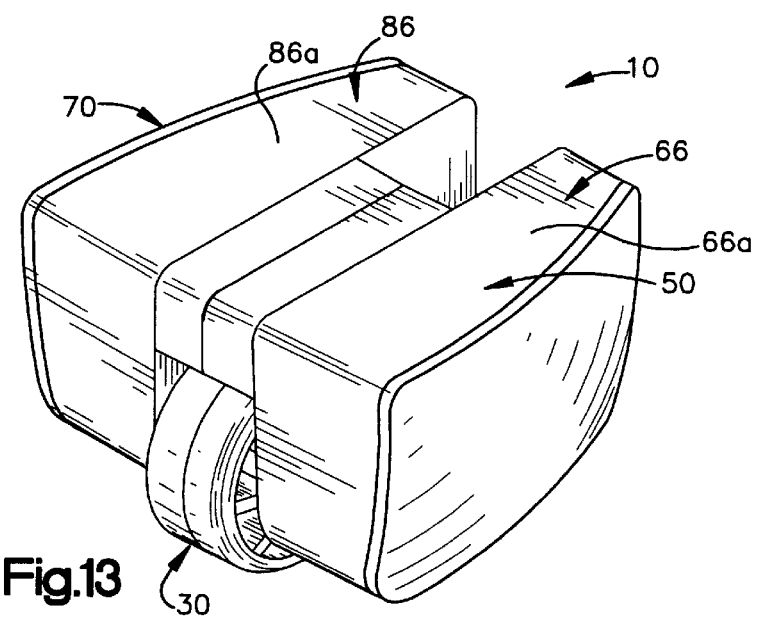
FIG. 13 is a perspective view of the caster assembly of FIG. 1 with the pair of support pieces oriented in a third support configuration.

A third support configuration is shown in FIG. 13. In the third support configuration, the first and second support pieces 50, 70 are both rotated 90 degree counterclockwise (as viewed looking from the right hand side of FIG. 1). In this third support configuration, an object (not shown) is supported by a second support surface 65 of the first support piece 50 and a second support surface 85 of the second support piece 70. The second support surface 65 comprises first and second aligned, planar horizontal support surfaces 66, 67 (best seen in FIG. 8). The first horizontal support surface 66 is defined by the main support body 51 of the first support piece 50 while the second horizontal support surface 67 is defined by a side surface of the triangular shaped projection 57 of the first support piece 50. The first and second horizontal support surfaces 66, 67 of the second support surface 65 support a lower surface of the object being supported.

Similarly, the second support surface 85 of the second support piece 70 comprises aligned, planar first and second horizontal support surfaces 86, 87 (best seen in FIG. 6). The first horizontal support surface 86 is defined by the main support body 71 of the second support piece 70 while the second horizontal support surface 87 is defined by a side surface of the triangular shaped projection 77 of the second support piece 70. The first and second horizontal support surfaces 86, 87 of the second support surface 85 also support a lower surface of the object being supported.

Thin layers of adhesive 66a, 67a, 86a, 87a are advantageously applied to the support surfaces 66, 67, 86, 87 to affix the support surfaces to the object to be supported. Note that the interlocking contact of the beveled surfaces 60, 80 of the respective projections 57, 87 results in both the first and second support pieces 50, 70 moving counterclockwise in unison when the first support surface 50 is rotated 90 degrees counterclockwise from the support configuration shown in FIG. 1 to the support configuration shown in FIG. 13.

This third flat support configuration is advantageous when the bottom surface of the object to be supported is flat and expansive, i.e., the bottom surface to be supported is too large to fit into the rectangular shaped support areas of the first and second support configurations (FIGS. 1 and 13). In this support configuration, the support surfaces 66, 86 advantageously provide a large support area over which the weight of the supported object is distributed.

Fourth Support Configuration

Figure 14:
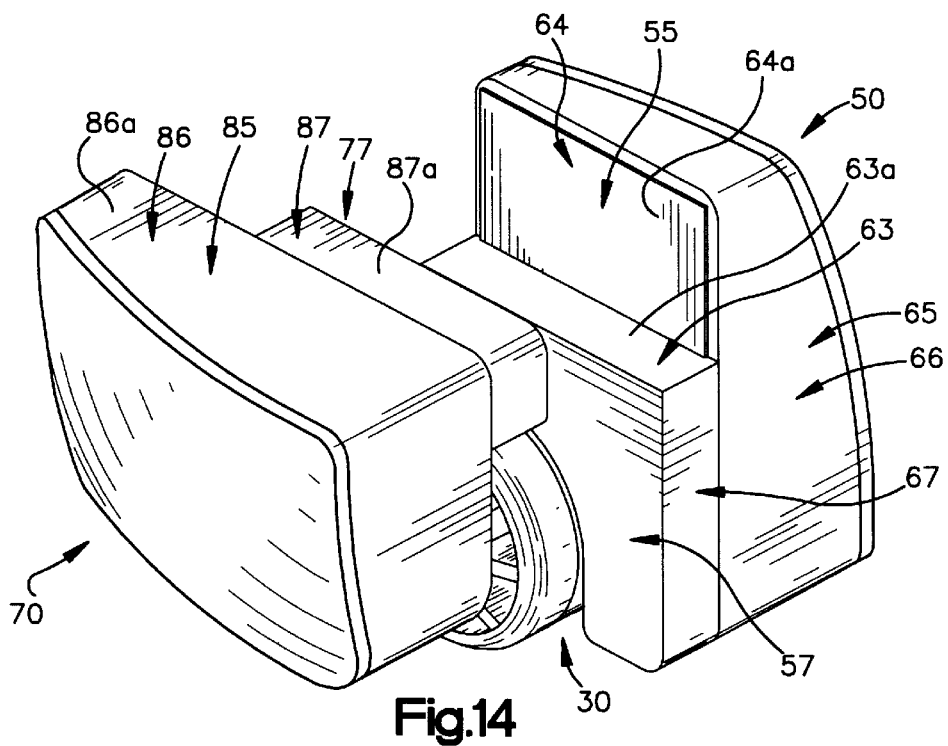
FIG. 14 is a perspective view of the caster assembly of FIG. 1, the support pieces oriented in a fourth support configuration.
Figure 15:
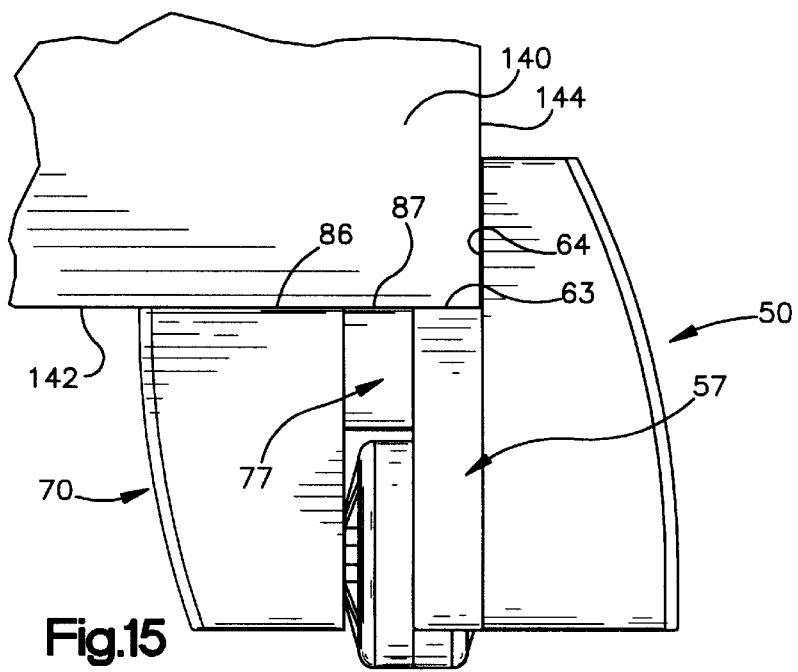
FIG. 15 is a front elevation view of the caster assembly of FIG. 1 in the fourth support configuration supporting both the bottom and side surfaces of an object.

A fourth support configuration is shown in FIGS. 14 and 15. This configuration is ideal for providing support for an outer or peripheral side surface 144 of an object 140 that is too wide to fit between the vertical support surfaces 64, 64 in support configurations one and two. As can be seen in FIG. 15 both a bottom surface 142 and a side surface 144 of the object 140 are supported providing enhanced stability from the side surface support. In this fourth support configuration, the second support piece 70 only is rotated 90 degree counterclockwise (as viewed looking from the right hand side of FIG. 1) from the position shown in FIG. 1, while the first support piece stays in the upright position shown in FIG. 1. In this fourth support configuration, the beveled surfaces 60, 80 are not in contact since the second support piece 70 has been rotated 90 degrees counterclockwise. The beveled surfaces 60, 80 would, however, advantageously prevent a use from improperly rotating the second support piece 70 in a clockwise direction with respect to the first support piece 50. Permitting rotation of the second support piece 70 in only one direction with respect the to first support piece 50 makes it foolproof for a user to orient the caster assembly 10 into a desired support configuration.

The aligned, planar support surfaces 86, 87 of the second support piece 70 and the bottom support surface 63 of the first support piece 50 support the bottom surface 142 of the object 140 while the side support surface 64 of the first support piece 70 supports the side surface 144 of the object 140. Thin layers of adhesive 86a, 87a, 63a, 64a are advantageously applied to the respective support surfaces 86, 87, 63, 64 to affix the support surfaces to the contacted portions of the bottom and side surfaces 142, 144 of the object 140.

Note that the first and second support surfaces 62, 65 of the first support piece 50 include support surfaces that are perpendicular, e.g., both the horizontal and vertical support surfaces 63, 64 of the first support surface 62 are perpendicular to the first and second horizontal support surfaces 66, 67 of the second support surface 65. Thus, the first and second support surfaces 62, 65 provide perpendicular support surfaces and provide for a plurality of support configurations. Similarly, the first and second support surfaces 82, 85 of the second support piece 70 include support surfaces that are perpendicular, e.g., both the horizontal and vertical support surfaces 83, 84 of the second support surface 82 are perpendicular to the first and second horizontal support surfaces 86, 77 of the second support surface 85. Thus, the first and second support surfaces 82, 85 provide perpendicular support surfaces and provide for a plurality of support configurations.

While the present invention has been described with a degree of particularity, it is the intent that the invention include all modifications and alterations from the disclosed embodiments falling within the spirit or scope of the appended claims.

What is claimed is:

1. A caster assembly adapted to provide a plurality of support configurations for supporting an object, the caster assembly comprising:

a) a caster axle;

b) a caster wheel rotatably mounted on the caster axle; and c) first and second support pieces mounted on the caster axle, at least one of the first and second support piece being rotatable with respect to the caster axle and with respect to the other of the first and second support pieces, the first support piece including a first support surface and a second support surface transverse to the first support surface, each of the first and second support surfaces configured to engage and support such object, the second support piece including a first support surface configured to engage and support such object, a first support configuration of the plurality of support configurations being defined by the first support surface of the first support piece and the first support surface of the second support piece engaging and supporting such object and a second support configuration of the plurality of support configuration being defined by the second support surface of the first support piece and the first support surface of the second support piece engaging and supporting such object.

2. The caster assembly of claim 1 wherein both the first and second support pieces are rotatably mounted on the axle and the first and second support surfaces of the first support piece are perpendicular.

3. The caster assembly of claim 1 wherein the first and second support surfaces of the first support piece and the first support surface of the second support piece include a layer of adhesive adapted to engage and affix the caster assembly to such object.

4. The caster assembly of claim 1 wherein the second support surface of the first support piece includes a lower weight bearing support surface portion and a side support surface portion perpendicular to the lower weight bearing support surface portion.

5. The caster assembly of claim 4 wherein the lower weight bearing support surface portion of the second support surface of the first support piece is defined by a stepped portion extending from the side support surface portion, the stepped portion defines a generally planar surface that is parallel to and offset from a central longitudinal axis of the caster axle.

6. The caster assembly of claim 5 wherein the side support surface portion of the second support surface of the first support piece defines a generally planar surface that is perpendicular to and offset from the caster axle central longitudinal axis.

7. The caster assembly of claim 6 wherein the first support surface of the first support piece defines a generally planar surface that is perpendicular to the planar surface of the side support surface portion of the second support surface of the first support surface and is perpendicular to and offset from the caster axle central axis.

8. The caster assembly of claim 1 wherein the second support piece additionally includes a second support surface transverse to the first support surface, a third support configuration of the plurality of support configurations being defined by the first support surface of the first support piece and the second support surface of the second support piece engaging and supporting such object and a fourth support configuration of the plurality of support configuration being defined by the second support surface of the first support piece and the second support surface of the second support piece engaging and supporting such object.

9. The caster assembly of claim 1 further including a pair of fasteners that engage opposite ends of caster axle and wherein each of the first and second support pieces includes a throughbore for mounting the support pieces on the caster axle.

10. The caster assembly of claim 9 wherein at least one of the first and second support pieces are adjustably positionable along the caster axle.

11. A method of supporting an object using a caster assembly adapted to provide a plurality of support configurations, the steps of the method comprising:
   a) providing a caster assembly including:
      1) a caster axle;
      2) a caster wheel mounted on the caster axle; and
      3) first and second support pieces mounted on the caster axle, at least one of the first and second support pieces being rotatable with respect to the caster axle and with respect to the other of the first and second support pieces, the first support piece including a first support surface and a second support surface transverse to the first support surface, each of the first and second support surfaces configured to engage and support the object, the second support piece including a first support surface configured to engage and support the object wherein a first support configuration of the plurality of support configurations is defined by the first support surface of the first support piece and the first support surface of the second support piece engaging and supporting the object and a second support configuration of the plurality of support configuration is defined by the second support surface of the first support piece and the first support surface of the second support piece engaging and supporting the object;
   b) rotating at least one of the first and second support pieces to orient the first and second support with respect to the object in a selected one of the first and second support configurations; and
   c) moving the caster assembly with respect to the object such that the first and second support pieces engage and support the object in the selected one of the first and second support configurations.

12. The method of supporting an object using a caster assembly of claim 11 wherein the first and second support surfaces of the first support piece and the first support surface of the second support piece include adhesive and in step c, the first and second support pieces adhesively engage the object.

13. The method of supporting an object using a caster assembly of claim 11 wherein the first and second support pieces are both rotatable with respect to the caster axle and at least one of the first and second support pieces is adjustably positionable along the caster axle and step includes the step of positioning the first and second support pieces along the caster axle.

14. The method of supporting an object using a caster assembly of claim 11 wherein the second support piece additionally includes a second support surface transverse to the first support surface and wherein a third support configuration of the plurality of support configurations is defined by the first support surface of the first support piece and the second support surface of the second support piece engaging and supporting such object and a fourth support configuration of the plurality of support configuration is defined by the second support surface of the first support piece and the second support surface of the second support piece engaging and supporting such object and step b includes the step of rotating the first and second support pieces to orient the first and second support with respect to the object in a selected one of the first, second, third and fourth support configurations and step c includes the step of moving the caster assembly with respect to the object such that the first and second support pieces engage and support the object in the selected one of the first, second, third and fourth support configurations.

15. A caster assembly comprising:
   a) a caster axle;
   b) a wheel mounted on the caster axle; and
   c) a first and second support pieces mounted on the caster axle, at least one of the first and second support pieces being rotatable with respect to the other of the first and second support pieces, the first support piece having a first support surface for engaging and supporting an object in a first orientation of the first support piece with respect to the caster axle and a second support surface for engaging and supporting such object in a second orientation of the first support piece with respect to the caster axle, the first and second orientations being different and the first support surface being transverse to the second support surface and the second support piece having a first support surface for engaging and supporting such object.

16. The caster assembly of claim 15 wherein the first and second support surfaces of the first support piece are perpendicular.

17. The caster assembly of claim 15 wherein the first and second support surfaces of the first support piece and the first support surface of the second support piece include a layer of adhesive adapted to engage and affix the caster assembly to such object.

18. The caster assembly of claim 15 wherein the second support surface of the first support piece includes a lower weight bearing support surface portion and a side support surface portion perpendicular to the lower weight bearing support surface portion.

19. The caster assembly of claim 18 wherein the lower weight bearing support surface portion of the second support surface of the first support piece is defined by a stepped portion extending from the side support surface portion, the stepped portion defines a generally planar surface that is parallel to and offset from a central longitudinal axis of the caster axle.

20. The caster assembly of claim 19 wherein the side support surface portion of the second support surface of the first support piece defines a generally planar surface that is perpendicular to and offset from the caster axle central longitudinal axis.

21. The caster assembly of claim 20 wherein the first support surface of the first support piece defines a generally planar surface that is perpendicular to the planar surface of the side support surface portion of the second support surface of the first support surface and is perpendicular to and offset from the caster axle central axis.

22. The caster assembly of claim 15 wherein the second support piece additionally includes a second support surface transverse to the first support surface.

23. The caster assembly of claim 15 further including a pair of fasteners that engage opposite ends of caster axle and wherein each of the first and second support pieces includes a throughbore for affixing the support pieces on the caster axle.

24. The caster assembly of claim 23 wherein at least one of the first and second support pieces are adjustably positionable along the caster axle.

25. The caster assembly of claim 15 wherein the wheel is rotatably mounted on the caster axle.

26. The caster assembly of claim 15 wherein at least one of the first and second support pieces is rotatable with respect to the caster axle.

27. The caster assembly of claim 26 wherein both the first and second support pieces are rotatable with respect to the caster axle.

* * * * *